(12) United States Patent
Lee et al.

(10) Patent No.: US 9,343,733 B2
(45) Date of Patent: May 17, 2016

(54) ELECTRODE HAVING 3-DIMENSIONAL PORE NETWORK STRUCTURE, LITHIUM BATTERY INCLUDING ELECTRODE, AND METHOD OF MANUFACTURING ELECTRODE

(71) Applicant: Samsung SDI Co., Ltd., Yongin-si, Gyeonggi-do (KR)

(72) Inventors: Jin-Hyon Lee, Yongin-si (KR); Man-Seok Han, Yongin-si (KR); Jong-Ki Lee, Yongin-si (KR)

(73) Assignee: Samsung SDI Co., Ltd., Yongin (KR)

( * ) Notice: Subject to any disclaimer, the term of this patent is extended or adjusted under 35 U.S.C. 154(b) by 386 days.

(21) Appl. No.: 13/775,719

(22) Filed: Feb. 25, 2013

(65) Prior Publication Data

US 2014/0038045 A1    Feb. 6, 2014

(30) Foreign Application Priority Data

Jul. 31, 2012  (KR) .................. 10-2012-0084189

(51) Int. Cl.
| | |
|---|---|
| *H01M 4/62* | (2006.01) |
| *H01M 4/80* | (2006.01) |
| *H01M 4/137* | (2010.01) |
| *H01M 4/1399* | (2010.01) |
| *H01M 4/13* | (2010.01) |
| *H01M 4/139* | (2010.01) |
| *H01M 10/052* | (2010.01) |
| *H01M 4/131* | (2010.01) |
| *H01M 4/1391* | (2010.01) |
| *H01M 4/02* | (2006.01) |

(52) U.S. Cl.
CPC ............ *H01M 4/137* (2013.01); *H01M 4/13* (2013.01); *H01M 4/139* (2013.01); *H01M 4/1399* (2013.01); *H01M 4/62* (2013.01); *H01M 10/052* (2013.01); *H01M 4/131* (2013.01); *H01M 4/1391* (2013.01); *H01M 2004/021* (2013.01); *Y02E 60/122* (2013.01); *Y02P 70/54* (2015.11)

(58) Field of Classification Search
CPC ....... H01M 4/668; H01M 4/80; H01M 4/137; H01M 4/1399
USPC ............. 429/212–216, 233, 209; 427/58, 462
See application file for complete search history.

(56) References Cited

U.S. PATENT DOCUMENTS

| | | | |
|---|---|---|---|
| 7,767,346 B2 | 8/2010 | Kim et al. | |
| 8,048,567 B2 | 11/2011 | Kim et al. | |
| 2006/0024579 A1* | 2/2006 | Kolosnitsyn et al. | 429/209 |
| 2007/0154807 A1* | 7/2007 | Kalynushkin et al. | 429/209 |

(Continued)

FOREIGN PATENT DOCUMENTS

| | | | |
|---|---|---|---|
| JP | 07-296795 A | 11/1995 | |
| JP | 08-138651 A | 5/1996 | |

(Continued)

*Primary Examiner* — James Lee
(74) *Attorney, Agent, or Firm* — Knobbe Martens Olson & Bear LLP

(57) ABSTRACT

An electrode having a three-dimensional pore network structure including a fibrous pore channel is disclosed. A lithium battery including the electrode and a method of manufacturing the electrode are also disclosed. The three-dimensional pore network structure formed in the electrode allows for improved mobility of lithium ions in the electrode. Therefore, a lithium battery including the electrode may have improved output characteristics.

12 Claims, 6 Drawing Sheets

(56) References Cited

U.S. PATENT DOCUMENTS

2008/0003503 A1* 1/2008 Kawakami et al. ........ 429/231.5
2012/0107683 A1* 5/2012 Kim et al. ................... 429/211

FOREIGN PATENT DOCUMENTS

KR     2007-0041900 A     4/2007
KR     2008-0098261 A     11/2008

* cited by examiner

→ : A MIGRATION PATH OF LITHIUM IONS

REMOVAL OF FIBROUS POLYMER

ELECTRODE HAVING 3-DIMENSIONAL PORE NETWORK STRUCTURE, LITHIUM BATTERY INCLUDING ELECTRODE, AND METHOD OF MANUFACTURING ELECTRODE

CROSS-REFERENCE TO RELATED APPLICATIONS

This application claims priority to and the benefit of Korean Patent Application No. 10-2012-0084189, filed on Jul. 31, 2012, the disclosure of which is incorporated herein in its entirety by reference.

BACKGROUND

1. Field of the Disclosure

One or more embodiments relate to electrodes having three-dimensional pore network structures, lithium batteries including the electrodes, and methods of manufacturing the electrodes.

2. Description of the Related Technology

A typical lithium secondary battery includes a positive electrode, a negative electrode, and either an organic electrolytic solution or a polymer electrolyte that fills the space between the positive and negative electrodes. The positive and negative electrodes each include an active material that allows lithium ions to be intercalated and deintercalated. In this structure, when lithium ions are intercalated and deintercalated between the positive and negative electrodes, oxidation and reduction reactions occur, and thus, electrical energy is generated.

In a process of manufacturing an existing high-capacity or large-capacity secondary battery, an electrode layer is generally formed with a thickness of 100 μm or more. With an electrode layer having a thickness greater than 100 μm, it is difficult to transfer lithium ions into the electrode, and thus, a concentration gradient of lithium ions in the electrode layer increases, which results in a deterioration of output characteristics of a battery. Therefore, there is a need to develop a method of facilitating the mobility of lithium ions in an electrode plate to address one or more of the above-described problems.

SUMMARY OF CERTAIN INVENTIVE ASPECTS

In one aspect, an electrode is disclosed that is capable of facilitating the mobility of lithium ions in electrode plates.

In another aspect, a lithium battery including an electrode is disclosed.

In another aspect, a method of manufacturing an electrode is disclosed.

In another aspect, an electrode is disclosed that includes a substrate, and an active material layer disposed on a surface of the substrate.

In some embodiments, the active material layer includes an active material and a three-dimensional pore network structure including a fibrous pore channel. In some embodiments, the three-dimensional pore network structure may be a structure in which the fibrous pore channel is three-dimensionally tangled. In some embodiments, an average diameter of the fibrous pore channel may be about 2 to about 20% of an average diameter of the active material. In some embodiments, a total porosity of the active material layer may be about 10 to about 40 volume %. In some embodiments, a distribution ratio of the fibrous pore channel and/or a porosity of the active material may increase towards the substrate away from a surface of the active material layer. In some embodiments, the active material layer may have a pore distribution gradient towards the substrate away from the surface of the active material layer such that a porosity of a region of 0 and 50% of a total thickness of the active material layer is about 0 to about 10% of a total porosity of the active material layer, a porosity of a region of 50 and 70% of the total thickness thereof is about 20% to about 40% of the total porosity of the active material layer, and a porosity of a region of 70 to 100% of the total thickness thereof is about 50% to about 80% of the total porosity of the active material layer. In some embodiments, the active material layer may further include a hollow fibrous polymer. In some embodiments, the fibrous pore channel is formed along an inside of the hollow fibrous polymer to form a three-dimensional pore network structure. In some embodiments, both ends of the hollow fibrous polymer may be open. In some embodiments, the hollow fibrous polymer may be porous. In some embodiments, the thickness of the active material layer may be about 50 to about 200 μm. In some embodiments, the thickness of the active material layer may be about 70 to about 200 μm. In some embodiments, the electrode may have an electrode density of about 1.5 to 4.0 g/cc. In some embodiments, the electrode may have absorbance of 100% within 10 minutes with respect to a non-aqueous electrolytic solution comprising a lithium salt and an organic solvent.

In another aspect, a lithium battery is disclosed that includes one or more of the electrodes described above.

In another aspect, a method of manufacturing an electrode having a three-dimensional pore network structure is disclosed. The method may include, for example, spinning a fibrous polymer on a substrate to form a fibrous frame corresponding to the three-dimensional pore network structure, coating an active material on the substrate on which the fibrous frame is formed to form an active material-fibrous frame complex, and heat-treating the active material-fibrous frame complex.

In some embodiments, the fibrous polymer may include one or more of polyurethane, polyetherurethane, polyurethane copolymer, cellulose acetate, cellulose acetate butylate, cellulose acetate propionate, polymethylmethacrylate (PMMA), polymethylacrylate (PMA), polyacryl copolymer, polyvinylacetate (PVAc), polyvinylacetate copolymer, polyvinyl alcohol (PVA), polyfurfuryl alcohol, polystyrene, polystyrene copolymer, polyethylene, polyethylene glycol, polyethylene oxide (PEO), polypropylene oxide (PPO), polyethylene oxide copolymer, polypropylene oxide copolymer, polycarbonate (PC), polyvinyl acetal, polyvinyl chloride (PVC), polycaprolactone, polyvinylpyrrolidone (PVP), polyvinylfluoride, polyvinylidene fluoride copolymer, and polyamide. In some embodiments, the spinning may be performed by electro-spinning, melt-blowing, flash spinning, or electrostatic melt-blowing. In some embodiments, the fibrous polymer may be spun so as to be three-dimensionally tangled. In some embodiments, the heat-treating may be performed at a pyrolytic temperature or more of the fibrous polymer, and the fibrous frame is removed by the heat-treating process. In some embodiments, the heat-treating may be performed in vacuum at a temperature of about 120 to about 200° C. In some embodiments, the fibrous polymer may be spun in a hollowed manner so as to form a hollow fibrous frame. In some embodiments, the heat-treating may be performed at a temperature lower than a pyrolytic temperature of the fibrous polymer, and the hollow fibrous frame may be maintained.

In another aspect, a method of manufacturing an electrode having a three-dimensional pore network structure is disclosed. The method may include, for example, spinning mineral oil on a substrate to form a fibrous frame corresponding to the three-dimensional pore network structure, coating an active material on the substrate on which the fibrous frame is formed to form an active material-fibrous frame complex, and removing the fibrous frame using an organic solvent.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
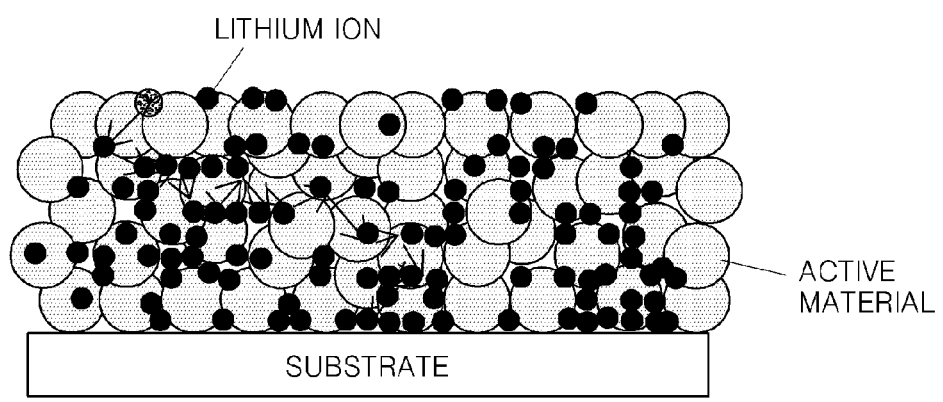
FIG. 1 is a schematic diagram illustrating a cross-section structure of a general electrode.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Hereinafter, exemplary embodiments of the present disclosure will be described in detail.

In general, in an electrode layer including a particle-shaped active material, an electrolytic solution is impregnated into pores formed between active material particles, and thus, lithium ions may diffuse through the pores between the active material particles. However, as the thickness of the electrode layer increases, it is difficult for the electrolytic solution to be easily impregnated into the electrode layer from a surface thereof. In addition, a migration path of lithium ions is so long that it is difficult for the lithium ions to easily move to the innermost portion of the electrode layer. Thus, a lithium battery including the electrode layer may have a reduced capacity.

To address one or more of these problems, a three-dimensional pore network structure including a fibrous pore channel is formed in an electrode layer, and thus, lithium ions may more easily migrate into the electrode layer. In particular, according to an embodiment of the present disclosure, an electrode includes a substrate, and an active material layer formed on at least one surface of the substrate. The active material layer includes an active material and the active material layer has a three-dimensional pore network structure including fibrous pore channels.

The substrate may be formed of any suitable material that does not cause a chemical change in a battery and has high conductivity. The substrate may be formed of at least one material selected from aluminum, copper, nickel, titanium, and stainless steel. In addition, the substrate may be formed of aluminum, copper, nickel, or stainless steel surface-treated with a coating ingredient, such as nickel, copper, aluminum, titanium, gold, silver, platinum, or palladium, by electroplating or ion deposition; or aluminum, copper, nickel, or stainless steel surface-coated with nanoparticles of one of these coating ingredients by dipping or compression. Also, a substrate formed of a non-conductive material coated with the above-listed conductive material may be used.

In some embodiments, substrate may have an uneven micro structure at its surface configured to improve an adhesive strength with an active material layer to be coated on the substrate. The substrate may be used in various forms including a film, a sheet, a foil, a net, a porous structure, a foam structure, a non-woven structure, and the like. The substrate may generally have a thickness of about 3 μm to about 500 μm. The active material layer including an active material is disposed on at least one surface of the substrate.

In some embodiments, electrode may be used as a positive electrode or negative electrode for a lithium battery or both of them. When the electrode is used as a positive electrode of a lithium battery, the active material layer includes a positive active material. As the positive active material, any lithium-containing metal oxide commonly used in the art may be used. For example, the positive active material may be a compound that intercalates and/or deintercalates lithium, such as $LiCoO_2$, $LiNiO_2$, $LiMnO_2$, $LiMn_2O_4$, $Li(Ni_aCo_bMn_c)O_2$ where $0<a<1$, $0<b<1$, $0<c<1$, and $a+b+c=1$, $LiNi_{1-Y}Co_YO_2$, $LiCo_{1-Y}Mn_YO_2$, $LiNi_{1-Y}Mn_YO_2$ where $0\leq Y<1$, $Li(Ni_aCo_bMn_c)O_4$ where $0<a<2$, $0<b<2$, $0<c<2$, and $a+b+c=2$, $LiMn_{2-z}Ni_zO_4$, $LiMn_{2-z}Co_zO_4$ where $0<z<2$, $LiCoPO_4$, or $LiFePO_4$. The positive active material may be used alone or at least two of these positive active materials may be used in combination.

When the electrode is used as a negative electrode of a lithium battery, the active material layer includes a negative active material. The negative active material may be any material generally used in the art. Non-limiting examples of the negative active material include lithium metal, a metal alloyable with lithium, a transition metal oxide, a material for doping or undoping lithium, and a material for reversibly intercalating or deintercalating lithium ions.

Examples of the transition metal oxide include tungsten oxide, molybdenum oxide, titanium oxide, lithium titanium oxide, vanadium oxide, lithium vanadium oxide, and the like.

Examples of the material for doping or undoping lithium include Si; $SiO_x$ where $0<x<2$; Si—Y alloy where Y is an alkali metal, an alkali earth metal, a Group XIII element, a Group XIV element, a transition metal, a rare-earth element, or a combination thereof and is not Si; Sn; $SnO_2$; and Sn—Y where Y is an alkali metal, an alkali earth metal, a Group XIII element, a Group XIV element, a Group XV element, a Group XVI element, a transition metal, a rare-earth element, or a combination thereof and is not Sn. Also, at least one of the materials for doping or undoping lithium may be used in combination with $SiO_2$. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material for reversibly intercalating or deintercalating lithium ions may be any one of various carbonaceous negative active materials that are generally used in a lithium battery. Examples of the material for reversibly intercalating or deintercalating lithium include crystalline carbon, amorphous carbon, and combinations thereof. Examples of the crystalline carbon include natural graphite and artificial graphite, each of which has an amorphous shape, a plate shape, a flake shape, a spherical shape, or a fiber shape. Examples of the amorphous carbon include soft carbon (low-temperature calcined carbon), hard carbon, meso-phase pitch carbide, and calcined coke.

In some embodiments, active material layer may have a three-dimensional pore network structure including a fibrous pore channel. The three-dimensional pore network structure may be a structure in which one-dimensional fibrous pore channels are three-dimensionally dispersed and tangled in the active material layer. Thus, a path that allows lithium ions to be easily diffused into the active material layer may be obtained.

The three-dimensional pore network structure may be formed using the following method:

A one-dimensional fibrous polymer may be spun on a substrate by electro-spinning or high-temperature spinning to form a fibrous frame corresponding to the three-dimensional pore network structure. Subsequently, the substrate on which the fibrous frame is formed is coated with a slurry for forming an active material layer so that the fibrous frame is packed with an active material included in the slurry. Then, the resulting structure is heat-treated to remove the fibrous frame therefrom to form a pore channel. When a fibrous frame is formed using a hollow fibrous polymer in which a continuous pore channel is formed at a center portion in a longitudinal direction, it is not needed to remove the hollow fibrous polymer in order to form a pore channel in the active material layer. Alternatively, the pore channel may be formed by spinning mineral oil instead of the fibrous polymer and removing the mineral oil from the resulting structure by using an organic solvent.

Unlike an existing pore structure in which pores are formed between active material particles, the three-dimensional pore network structure including a fibrous pore channel enables the formation of a pore channel in the active material layer with a desired distribution of pores and a desired pore shape. In addition, the continuous fibrous pore channel may facilitate the diffusion of an electrolytic solution and lithium ions into the active material layer.

Figure 2:
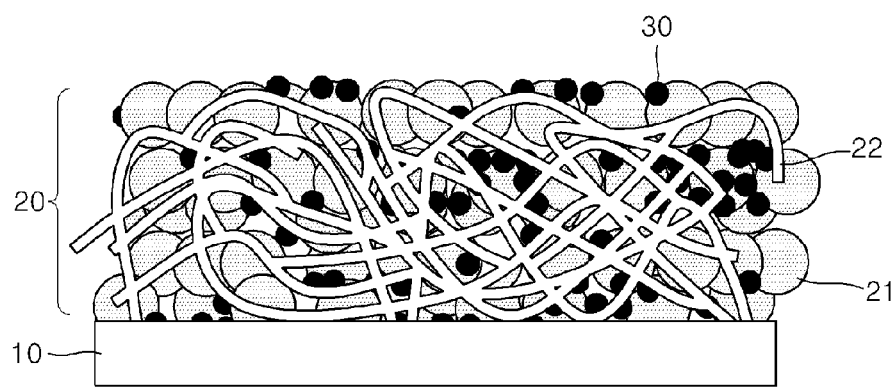
FIG. 2 is a schematic diagram illustrating a cross-section structure of an electrode according to another embodiment of the present disclosure.

Such a difference will now be described with reference to FIGS. 1 and 2. FIG. 1 is a schematic diagram illustrating a cross-section structure of a general electrode. FIG. 2 is a schematic diagram illustrating a cross-section structure of an electrode according to an embodiment of the present disclosure. As shown in FIG. 1, in an existing electrode structure, an electrolytic solution is impregnated into pores formed between active material particles, and thus, a migration path of lithium ions is considerably restricted and it is difficult for the lithium ions to easily move into the electrode.

In contrast, as shown in FIG. 2, the electrode includes a substrate 10 and an active material layer 20 formed on the substrate 10 and includes an active material 21, wherein the active material layer 20 has a three-dimensional pore network structure in which a fibrous pore channel 22 is in spun form. The fibrous pore channel 22 is formed inside of the active material layer 20 that has difficulties contacting an electrolytic solution, for example, to the innermost portion thereof nearest the substrate 10, and thus, increases a contact surface with the electrolytic solution inside the active material layer 20, which results in an improved mobility of lithium ions 30.

Figure 3:
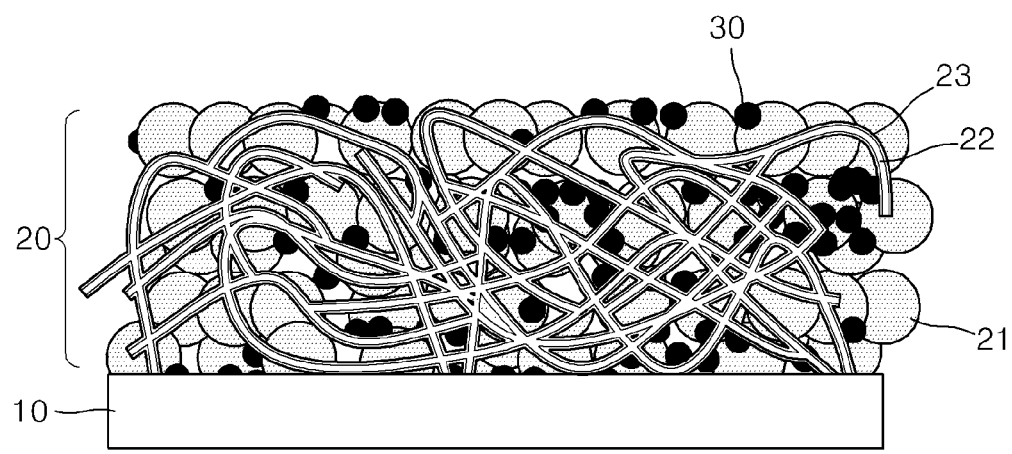
FIG. 3 is a schematic diagram illustrating a cross-section structure of an electrode according to another embodiment of the present disclosure.

FIG. 3 is a schematic diagram illustrating a cross-section structure of an electrode according to another embodiment of the present disclosure. In the present embodiment, the active material layer 20 may further include a hollow fibrous polymer 23. In this case, a continuous pore formed in the hollow fibrous polymer 23 serves as the pore channel 22. The active material layer 20 may be prepared by forming a fibrous frame by using the hollow fibrous polymer 23, coating the fibrous frame with the active material 21, and heat-treating the resulting structure at a temperature range that does not remove the hollow fibrous polymer 23 to form the active material layer 20 having a three-dimensional pore network structure. Also, the hollow fibrous polymer 23 may be removed by heat treatment at a pyrolytic temperature or more, and accordingly, the pore channel 22 having a cross-section larger than a cross-section of a hollow in the hollow fibrous polymer 23 may be formed.

The hollow fibrous polymer 23 may have a structure in which both ends thereof are open or a porous structure in which pores are formed in a surface thereof. Such a structure enables an electrolytic solution to be impregnated into the hollow fibrous polymer 23 so that lithium ions may move therethrough.

According to some embodiments, an average diameter of the pore channel 22 may be determined to be within an appropriate range by considering the impregnation of an electrolytic solution. If the average diameter of the pore channel 22 is too large, however, a mass density of the electrode may be reduced or an energy density of an electrode plate may be decreased. Therefore, the average diameter of the pore channel 22 is determined considering these factors. For example, the average diameter of the pore channel 22 may be about 2% to about 20% of an average diameter of the active material 21, but is not limited thereto.

In some embodiments, a total porosity of the active material layer 20 may be about 10 volume % to about 40 volume %.

In addition, the active material layer may have a pore distribution gradient according to the depth of the active material layer in a direction from the surface of the active material layer to the substrate. For example, a distribution ratio of the pore channel may increase towards the substrate away from the surface of the active material layer, and thus, a porosity of the active material layer may increase.

Figure 4:
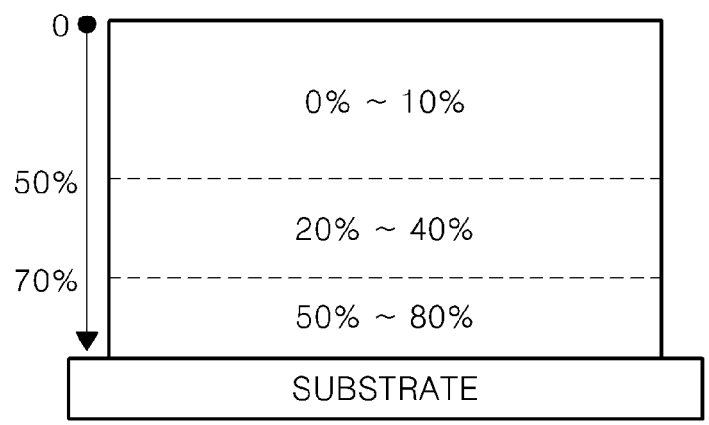
FIG. 4 is a cross-sectional diagram illustrating a porosity according to the thickness of an electrode according to another embodiment of the present disclosure.

As shown in FIG. 4, the active material layer may have a pore distribution gradient towards the substrate away from the surface of the active material layer such that the porosity of a region from 0 to 50% (for example, 50% part) of a total thickness of the active material layer is about 0 to about 10% of the total porosity of the active material layer, the porosity of a region from 50 to 70% of the total thickness thereof is about 20% to about 40% of the total porosity of the active material layer, and the porosity of a region from about 70% to 100% of the total thickness thereof is about 50% to about 80% of the total porosity of the active material layer.

In general, it may be relatively difficult to impregnate an electrolytic solution into a bottom portion of the active material layer rather than a surface thereof. Thus, in such a pore distribution in which the porosity increases towards the substrate, the impregnation of the electrolytic solution may be facilitated by increasing the porosity of the pore channel towards the bottom portion of the active material layer that has difficulties being impregnated with the electrolytic solution. Accordingly, the mobility of lithium ions may be increased.

In some embodiments, the active material layer having such a three-dimensional pore network structure may enable lithium ions to effectively migrate in the electrode even when being formed as a thick film having a thickness of 70 μm or more in order to exhibit a high capacity. However, the thickness of the active material layer is not particularly limited. In one embodiment, the thickness of the active material layer may be about 50 μm to about 200 μm. For example, in some embodiments, the thickness of the active material layer may be about 70 μm to about 200 μm.

In some embodiments, the electrode may have an electrode density of about 1.5 g/cc to about 4.0 g/cc. In some embodiments, the electrode may have a good electrolytic solution impregnating property, and thus, the electrode may have absorbance of, for example, 100% within 10 minutes, with respect to a non-aqueous electrolytic solution including a lithium salt and an organic solvent.

Hereinafter, a method of manufacturing the electrode is described.

According to another embodiment of the present disclosure, a method of manufacturing an electrode having a three-dimensional pore network structure includes: spinning a fibrous polymer on a substrate to form a fibrous frame corresponding to the three-dimensional pore network structure; coating the substrate with an active material to form an active material-fibrous frame complex; and heat-treating the active material-fibrous frame complex.

The fibrous polymer used to form a fibrous frame corresponding to the three-dimensional pore network structure may be any material that does not affect the remaining active material layer and may be removed by heat, a chemical reaction, an organic solvent, or the like. The fibrous polymer used in the disclosure may be, for example, at least one selected from polyurethane, polyetherurethane, polyurethane copolymer, cellulose acetate, cellulose acetate butylate, cellulose acetate propionate, polymethylmethacrylate (PMMA), polymethylacrylate (PMA), polyacryl copolymer, polyvinylacetate (PVAc), polyvinylacetate copolymer, polyvinyl alcohol (PVA), polyfurfuryl alcohol, polystyrene, polystyrene copolymer, polyethylene, polyethylene glycol, polyethylene oxide (PEO), polypropylene oxide (PPO), polyethylene oxide copolymer, polypropylene oxide copolymer, polycarbonate (PC), polyvinyl acetal, polyvinyl chloride (PVC), polycaprolactone, polyvinylpyrrolidone (PVP), polyvinylfluoride, polyvinylidene fluoride copolymer, and polyamide. However, the polymer is not limited to the above examples, as long as the polymer is made in a fibrous form by electro-spinning.

The spinning of the fibrous polymer may be performed by electro-spinning, melt-blowing, flash spinning, or electrostatic melt-blowing. For example, when the fibrous polymer is spun by electro-spinning, first, the fibrous polymer is dissolved in an organic solvent, such as dimethylformamide, acetone, tetrahydrofuran, toluene, or a mixed solution thereof to prepare an electro-spinning solution with a viscosity suitable to form a fibrous polymer by electro-spinning.

An electro-spinning device includes a spinning nozzle connected to a quantitative pump for injecting a fixed quantity of a spinning solution, a high voltage generator, and an electrode on which a spun fiber layer is formed. A grounded metal plate is used as a negative electrode, and the spinning nozzle having a pump which controls a discharge quantity per hour is used as a positive electrode. The electro-spinning solution may be spun on the substrate by applying a voltage of about 10 to about 30 kV and controlling the solution discharge speed to about 10 to about 50 μl/min. In this regard, the solvent used may volatilize while the fibrous polymer is being spun at a rapid speed so that the diameter of the resulting fibrous polymer may decrease, and thus, the fibrous polymer is spun so as to form a fibrous frame having a diameter larger than the diameter of a pore channel to be formed. In addition, at the initial spinning stage, a large amount of the fibrous polymer may be spun on the substrate, and then, as the spun fibrous polymer accumulates on the substrate, the amount of the fibrous polymer to be spun may be decreased.

As described above, the fibrous polymer is continuously spun to form a fibrous frame having a three-dimensionally tangled structure and then removed by the subsequent heat treatment process. As a result, a three-dimensional pore network structure having an original shape is obtained.

Then, an active material is coated on the substrate on which the fibrous frame is formed to form an active material-fibrous frame complex. As the active material, an active material composition formed by mixing a positive or negative active material, a binder, a conductive material (optionally used), and a solvent may be used. In this regard, the positive or negative active material described above may be used, and the binder, the conductive material, and the solvent may be any materials that are generally used in the art.

The active material composition is coated on the substrate on which the fibrous frame is formed to a predetermined thickness, to form a complex in which the fibrous frame is packed with the active material. Additionally, to increase a packing density of the active material layer, the active material-fibrous frame complex may be pressed within a range in which the shape of the fibrous frame is maintained.

Then, the active material-fibrous frame complex may be heat-treated. The fibrous frame may be decomposed by the heat-treatment process, and an active material layer having the three-dimensional pore network structure with the shape of the fibrous frame being maintained may be obtained. The heat-treatment temperature and atmosphere may be appropriately selected by considering the type of fibrous polymer used and a pyrolytic temperature thereof. For example, the heat-treatment process may be performed in vacuum at a temperature of about 120° C. to about 200° C.

Figure 5:
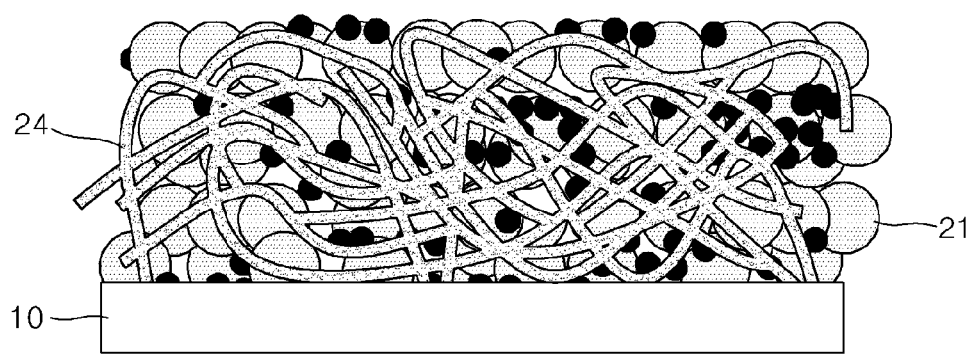
FIG. 5 is a schematic diagram illustrating a method of manufacturing an electrode, according to another embodiment of the present disclosure.
Figure 5:
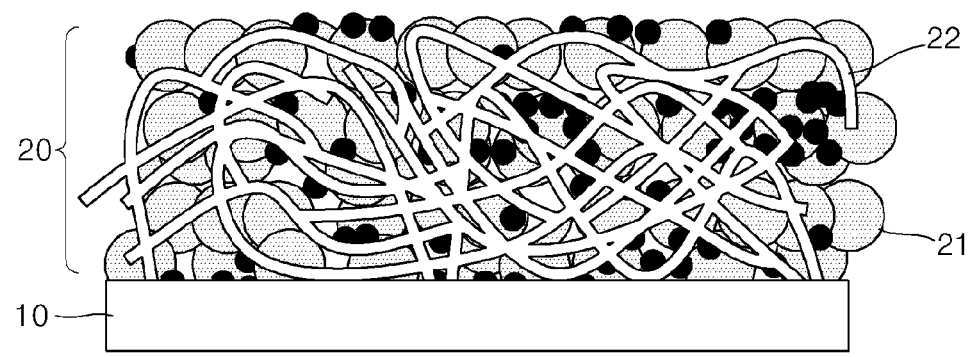

FIG. 5 is a schematic diagram illustrating a method of manufacturing an electrode, according to an embodiment of the present disclosure. As shown in FIG. 5, the active material layer 20 in which the pore channel 22 is formed between particles of the active material 21 may be formed by spinning the fibrous polymer 24 on the substrate 10 to form a fibrous frame, coating the active material 21 on the substrate 10 with the fibrous frame formed thereon, and heat-treating the resulting structure to remove the fibrous polymer 24.

According to another embodiment, the fibrous polymer may be spun so as to form a hollow fibrous polymer. The fibrous polymer may be spun to form a hollow structure by variously adjusting a spinning nozzle. When the hollow fibrous frame is formed, a pore channel is formed in the hollow fibrous frame, and thus, there is no need to remove the hollow fibrous frame after coating the active material on a substrate with the hollow fibrous frame formed thereon. In this case, the heat-treatment process may be performed at a temperature lower than the pyrolytic temperature of the fibrous polymer used.

Selectively, the heat-treatment process may be performed at a temperature higher than the pyrolytic temperature of the hollow fibrous polymer to remove the hollow fibrous polymer by decomposition. In this case, a pore channel having a diameter larger than the diameter of a hollow in the hollow fibrous polymer may be formed in the active material layer.

According to another embodiment, mineral oil may be used instead of the fibrous polymer to manufacture the electrode having a three-dimensional pore network structure. In this case, the electrode having a three-dimensional pore network structure may be manufactured by spinning mineral oil on a substrate to form a fibrous frame corresponding to a three-dimensional fibrous network structure; coating an active material on the substrate on which the fibrous frame is formed to form an active material-fibrous frame complex; and removing the fibrous frame with an organic solvent.

Mineral oil is a byproduct of the crude-oil refining process and is a mixture of liquid hydrocarbons including alkanes and paraffin as main ingredients. Mineral oil is relatively inexpensive, and thus, the manufacturing costs may be reduced. To spin mineral oil, when the mineral oil is injected into a syringe at a constant speed while applying an external electric field to the syringe, the mineral oil may be spun by the external electric field in a sticky fiber form. Subsequently, the mineral oil spun on the substrate in a fiber form is dried at room temperature to form a mineral oil fiber. In this regard, an external voltage applied may be about 50 V to about 20 KV, and may vary depending on a distance between the substrate and the syringe into which the mineral oil is injected.

Then, the substrate on which the fibrous frame formed of mineral oil is formed may be coated with an active material and then removed using an organic solvent to obtain an active material layer having the three-dimensional pore network structure. The organic solvent may be any organic solvent capable of dissolving mineral oil. Non-limiting examples of the organic solvent include octane, dichloromethane, hexane, ether, chloroform, acetone, and xylene.

According to another embodiment of the present disclosure, a lithium battery includes the electrode described above. The electrode may be used as at least one of a positive electrode and negative electrode of a lithium battery. The three-dimensional pore network structure of the electrode facilitates the mobility of lithium ions, thereby improving output characteristics of the lithium battery. In particular, such a structure may address the output reduction of high-capacity lithium batteries.

Figure 6:
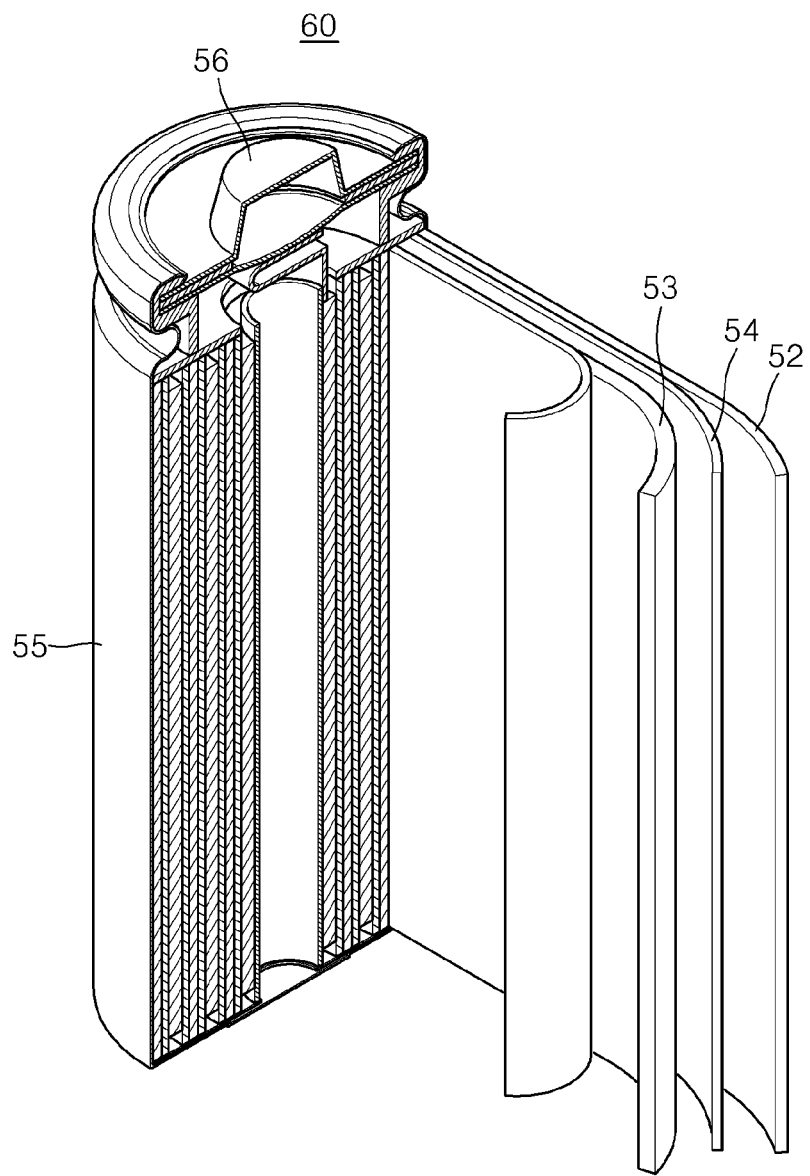
FIG. 6 is a schematic view of a lithium battery according to another embodiment of the present disclosure.

FIG. 6 is a schematic view of a lithium battery 60 according to an embodiment of the present disclosure. With reference to FIG. 6, the lithium battery 60 includes a positive electrode 53, a negative electrode 52, and a separator 54 between the positive electrode 53 and the negative electrode 52. At least one of the positive and negative electrodes 53 and 52 may be the electrode described above. The positive electrode 53 or the negative electrode 52 that does not employ the electrode described above may be manufactured using materials and methods that are commonly used in the art.

The positive electrode 53 may be separated from the negative electrode 52 by the separator 54, and the separator 54 may be any of various suitable separators that are typically used in a lithium battery. In particular, the separator 54 may be formed of a material that has a low resistance to migration of ions of an electrolyte and an excellent electrolytic solution-retaining capability. For example, the separator 54 may include a material selected from glass fiber, polyester, Teflon, polyethylene, polypropylene, polytetrafluoroethylene (PTFE), and combinations thereof, each of which may be nonwoven or woven. The separator 54 may have a pore size of about 0.01 to about 10 μm and a thickness of about 5 to about 300 μm.

A lithium salt-containing non-aqueous electrolyte may include a non-aqueous electrolyte and lithium. Examples of the non-aqueous electrolyte are a non-aqueous electrolytic solution, an organic solid electrolyte, an inorganic solid electrolyte.

As the non-aqueous electrolytic solution, a non-protogenic organic solvent may be used. Examples of the non-protogenic organic solvent include, but are not limited to, N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofurane, 2-methyl tetrahydrofuran, dimethylsulfoxide, 1,3-dioxolane, formamide, dimethylformamide, acetonitrile, nitromethane, methyl formic acid, methyl acetatic acid, phosphoric acid triester, trimethoxy methane, dioxolane derivatives, sulfolanes, methyl sulfolanes, 1,3-dimethyl-2-imidazolidinone, propylene carbonate derivatives, tetrahydrofurane derivatives, ethers, methyl propionate, and ethyl propionate.

Examples of the organic solid electrolyte include, but are not limited to, a polyethylene derivative, a polyethylene oxide derivative, a polypropylene oxide derivative, a phosphate ester polymer, polyester sulfide, polyvinyl alcohol, poly fluorinated vinylidene, and a polymer having an ionic dissociable group.

Examples of the inorganic solid electrolyte are nitrides, halides, sulfides and silicates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like.

The lithium salt may be any one of various lithium salts that are suitable for use in a lithium battery. As a material dissolved in the non-aqueous electrolyte, for example, one or more of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithiumchloroborate, lower aliphatic carbonic acid lithium, 4 phenyl boric acid lithium, lithium imide, and the like may be used.

In some embodiments, the positive electrode 53, the negative electrode 52, and the separator 54 are wound or folded and then accommodated in a battery case 55. Subsequently, an electrolyte is injected into the battery case 55 and sealed with a sealing member 56, thereby completing the manufacture of the lithium battery 60. The battery case 55 may be of a cylindrical type, a rectangular type, or a thin film-type. The lithium battery may be a lithium ion battery.

In some embodiments, the lithium battery may be suitable for use as power sources for electric vehicles and power tools requiring a high capacity, a high-power output, and high temperature operability, in addition to power sources for general mobile phones and portable computers, and may be coupled to existing internal combustion engines, fuel cells, or super-capacitors to be used in hybrid vehicles. In addition, the lithium battery may be used in other applications requiring a high-power output, a high voltage, and high temperature operability.

One or more embodiments of the present disclosure will now be described in more detail with reference to the following examples. However, these examples are not intended to limit the scope of the one or more embodiments of the present disclosure.

Control

LiNi$_{1/3}$Co$_{1/3}$Mn$_{1/3}$O$_2$ as a positive active material, PVDF ([please include city and country]) as a binder, and a conductive agent (Denka black) were mixed in a weight ratio of 92:4:4. To adjust the viscosity of the mixture, N-methylpyrrolidone was added to the mixture so that the amounts of solids reached 50 wt % to prepare a positive active material slurry. The slurry was coated on an aluminum foil current collector having a thickness of 15 µm to manufacture a positive electrode plate. After the coating process was completed, the positive electrode plate was dried at 110° C. for 15 minutes and then pressed to form the positive electrode plate having a density of 3.3 g/cc and a thickness of 70 µm and including the aluminum foil current collector. The dried positive electrode plate was heat-treated in a vacuum atmosphere at 110° C. for 1 hour and cut to a size of 16 mm×16 mm to manufacture a positive electrode for a coin cell. Next, the positive electrode was assembled with a Li metal as a counter electrode, a polyethylene separator having a thickness of 20 µm (STAR20, available from Asahi[please include city and country]), and an electrolyte to manufacture a 2016-standard coin cell. In this regard, the electrolyte contained a mixed solvent including ethylene carbonate (EC), ethylmethyl carbonate (EMC), and diethyl carbonate (DEC) at a volume ratio of 3:3:4 and 1.10 M of LiPF$_6$.

Comparative Example 1

A coin cell was manufactured in the same manner as in Control, except the positive electrode plate including the current collector was pressed to a thickness of 100 µm.

Example 1

First, 20 wt % of polyvinyl alcohol was dissolved in N,N-dimethylformamide to prepare an electro-spinning solution. The electro-spinning solution was electro-spun on an aluminum foil current collector having a thickness of 15 µm at a voltage of 10 kV and a spinning rate of 15 µl/min for 30 minutes. A spinning nozzle had an inner diameter of 1 mm, and a distance between the spinning nozzle and the aluminum foil current collector was 30 cm. The electro-spinning solution was electro-spun until the thickness of the electro-spun fibrous polymer reached 85 µm and then dried.

LiNi$_{1/3}$Co$_{1/3}$Mn$_{1/3}$O$_2$ as a positive active material, PVDF ([please include city and country]) as a binder, and a conductive agent (Denka black) were mixed in a weight ratio of 92:4:4. To adjust the viscosity of the mixture, N-methylpyrrolidone was added to the mixture so that the amounts of solids reached 50 wt % to prepare a positive active material slurry. The slurry was coated on the aluminum foil current collector with the prepared fibrous polymer frame formed thereon. After the coating process was completed, the positive electrode plate was dried at 110° C. for 15 minutes and then pressed to form the positive electrode plate having a mass density of 3.3 g/cc and a thickness of 100 µm and including the aluminum foil current collector. The dried positive electrode plate was heat-treated in a vacuum atmosphere at 150° C. for 1 hour to remove the fibrous polymer frame by decomposition. Then, the positive electrode plate was cut to a size of 16 mm×16 mm to manufacture a positive electrode for a coin cell.

Next, the positive electrode was assembled with a Li metal as a counter electrode, a polyethylene separator having a thickness of 20 µm (STAR20, available from Asahi[please include city and country]), and an electrolyte to manufacture a 2016-standard coin cell. In this regard, the electrolyte contained a mixed solvent including EC, EMC, and DEC at a volume ratio of 3:3:4 and 1.10 M of LiPF$_6$.

Evaluation Example 1

Test for Electrolytic Solution-Impregnating Property Over Time

To test electrolytic solution impregnating properties according to time of positive electrodes used in coin cells manufactured according to Control, Comparative Example 1, and Example 1, the electrolytic solution impregnating property over time of the electrode of each coin cell was measured using an electrolyte containing a mixed solvent of EC, EMC, and DEC at a volume ratio of 3:3:4 and 1.10 M of LiPF$_6$. The results are shown in FIG. 7.

Figure 7:
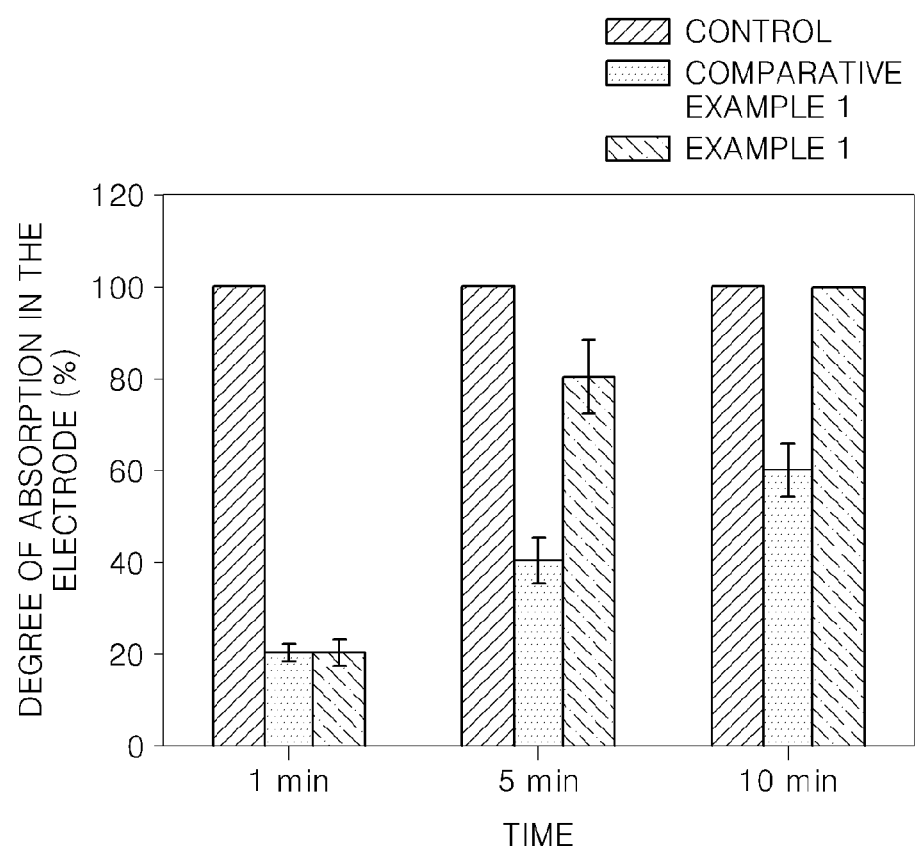
FIG. 7 is a graph showing measurement results of electrolyte solution impregnating properties over time of electrodes manufactured according to Example 1 and Comparative Example 1.

As shown in FIG. 7, in the control having a general electrode structure, the electrolytic solution was impregnated 100% into the electrode having a thickness of 70 µm and not including a particular pore network structure, within 1 minute. As compared to this, the positive electrodes of Example 1 and Comparative Example 1 having a thickness of 100 µm exhibited significantly different electrolytic solution impregnating properties according to whether or not they had the pore network structure.

In other words, the positive electrode of Comparative Example 1 not having the pore network structure had an electrolytic solution impregnation rate of no more than 60% in 10 minutes, while the positive electrode of Example 1 having the pore network structure had an electrolytic solution impregnation rate of 100% in 10 minutes.

Evaluation Example 2

Charge and Discharge Test

Figure 8:
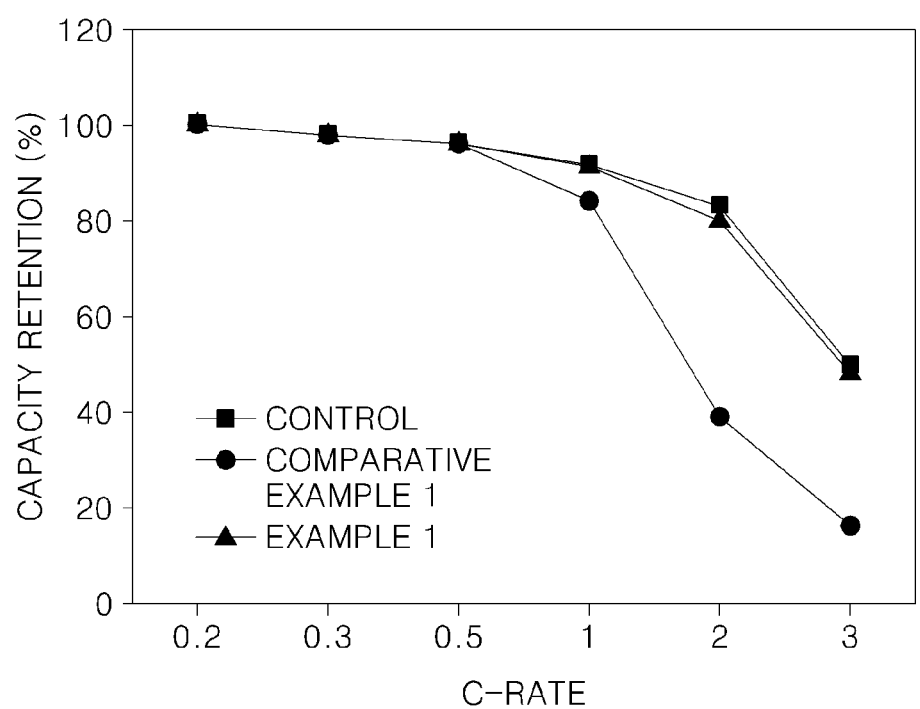
FIG. 8 is a graph showing rate characteristics of the electrodes of Example 1 and Comparative Example 1.

To evaluate rate characteristics of the coin cells of Control, Comparative Example 1, and Example 1, each coin cell was charged until a voltage thereof reached 4.3 V (vs. Li), and then discharged until a voltage thereof reached 3.0 V (vs. Li) at the same current. In an initial formation (FM) step, each coin cell was charged at a rate of 0.01 C (current density). After the charging, each coin cell was constant-current discharged until a voltage thereof reached 3.0 V (vs. Li) at discharge rates of 0.2 C (1 cycle), 0.33 C (2 cycles), 0.5 C (3 cycles), 1 C (4 cycles), 2 C (5 cycles), and 3 C (6 cycles). A capacity retention ratio of each coin cell was measured at each discharge rate, and the results are shown in FIG. 8. The capacity retention ratio (CRR) is defined by Equation 1 below:

$$\text{CRR [\%]} = [\text{discharge capacity at each cycle/discharge capacity at 0.2 C}] \times 100 \qquad \text{Equation 1}$$

As shown in FIG. 8, the coin cell of Example 1 exhibited a similarly small decrease in capacity at each rate to that of the coin cell of Control, while the coin cell of Comparative Example 1 exhibited a significantly greater decrease in capacity at each rate than that of the coin cell of Example 1.

From the results, it is confirmed that even when the coin cell of Example 1 includes an electrode formed as a thick film having a thickness of 100 µm, the coin cell of Example 1 has an improved electrolytic solution impregnating property, and thus, may have an improved battery characteristic.

As described above, according to the one or more of the above embodiments of the present disclosure, an electrode has a three-dimensional pore network structure including a fibrous pore channel, and thus, the mobility of lithium ions in the electrode may be improved. Therefore, a lithium battery including the electrode may have an improved output characteristic.

While the present invention has been described in connection with certain exemplary embodiments, it will be appreciated by those skilled in the art that various modifications and changes may be made without departing from the scope of the present disclosure. The drawings and the detailed description of certain inventive embodiments given so far are only illustrative, and they are only used to describe certain inventive embodiments, but are should not be considered to limit the meaning or restrict the range of the present invention described in the claims. Indeed, it will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Therefore, it will be appreciated to those skilled in the art that various modifications may be made and other equivalent embodiments are available. Accordingly, the actual scope of the present invention must be determined by the spirit of the appended claims, and equivalents thereof.

What is claimed is:

1. An electrode, comprising:
   a substrate; and
   an active material layer formed on at least one surface of the substrate,
   the active material layer comprising an active material, and
   the active material layer having a fibrous pore channel forming a three-dimensional pore network structure within the active material layer,
   the active material layer further comprising a hollow fibrous polymer, and
   the fibrous pore channel formed along an inside of the hollow fibrous polymer to form the three-dimensional pore network structure.

2. The electrode of claim 1, wherein the fibrous pore channel is three-dimensionally tangled within the three dimensional pore network structure.

3. The electrode of claim 1, wherein an average diameter of the fibrous pore channel is about 2% to about 20% of an average diameter of the active material.

4. The electrode of claim 1, wherein a total porosity of the active material layer is about 10 to about 40 volume %.

5. The electrode of claim 1, wherein both a distribution ratio of the fibrous pore channel and a porosity of the active material layer increases from a surface of the active material layer to the substrate.

6. The electrode of claim 5, wherein the active material layer has a pore distribution gradient from the surface of the active material layer to the substrate such that a porosity of a region of 0 and 50% of a total thickness of the active material layer is about 0 to about 10% of a total porosity of the active material layer, a porosity of a region of 50 and 70% of the total thickness thereof is about 20% to about 40% of the total porosity of the active material layer, and a porosity of a region of 70 and 100% of the total thickness thereof is about 50% to about 80% of the total porosity of the active material layer.

7. The electrode of claim 1, wherein both ends of the hollow fibrous polymer are open.

8. The electrode of claim 1, wherein the hollow fibrous polymer is porous.

9. The electrode of claim 1, wherein a thickness of the active material layer is about 50 to about 200 μm.

10. The electrode of claim 1, wherein the electrode has an electrode density of about 1.5 to 4.0 g/cc.

11. The electrode of claim 1, wherein the electrode has an absorbance of 100% within 10 minutes with respect to a non-aqueous electrolytic solution of a lithium salt and an organic solvent.

12. A lithium battery, comprising the electrode of claim 1.

* * * * *